Patented Mar. 31, 1953

2,633,408

UNITED STATES PATENT OFFICE 2,633,408

PROCESS FOR PRODUCING OXYCHLORIDES OF SILICON BY THERMAL CONVERSION OF ALKOXY TRICHLOROSILANES

Vaughan Morrill, Jr., St. Louis, Mo., assignor to Magic Chef, Inc., a corporation of New Jersey No Drawing. Application December 20, 1950, Serial No. 201,883

4 Claims. (Cl. 23—203)

The invention relates to an improved method of producing silicon oxychlorides, and particularly silicon oxychlorides having a boiling point above 390° F., which comprises thermally converting alkoxy trichlorosilanes, particularly the lower alkoxy trichlorosilanes such as methoxy, ethoxy, propoxy and butoxy trichlorosilanes in the presence of boron oxides.

The starting materials (the alkoxy trichlorosilanes) have been produced by Monsanto Chemical Company by reacting monohydric alcohols, such as methyl, ethyl, propyl, butyl, etc., with silicon tetrachloride, as illustrated by the following equations:

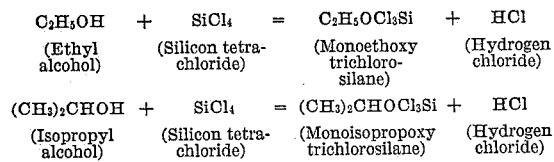

| $C_2H_5OH$ | + | $SiCl_4$ | = | $C_2H_5OCl_3Si$ | + | HCl |
| (Ethyl alcohol) | | (Silicon tetrachloride) | | (Monoethoxy trichlorosilane) | | (Hydrogen chloride) |

| $(CH_3)_2CHOH$ | + | $SiCl_4$ | = | $(CH_3)_2CHOCl_3Si$ | + | HCl |
| (Isopropyl alcohol) | | (Silicon tetrachloride) | | (Monoisopropoxy trichlorosilane) | | (Hydrogen chloride) |

The present application is a continuation-in-part of my prior application, Serial No. 4,717, filed January 27, 1948, now abandoned.

It has been found that methods of direct union of silicon, oxygen, and chlorine result only in very small amounts of oxychlorides of silicon with boiling points above 390° F. but give large amounts of silicon tetrachloride and oxychlorides with boiling points below 390° F. By reason of these methods producing or giving such small quantities of the oxychlorides of silicon with the desired boiling points above 390° F. these methods are highly impractical and would not be commercially acceptable.

It has also been found that other methods, such as partial hydrolysis of silicon tetrachloride, are even more impractical in the production of the desired oxychlorides of silicon and are more impractical and unacceptable as commercially feasible methods.

I have found that the thermal decomposition of alkoxy trichlorosilicates gives yields up to 85% oxychlorides of silicon with boiling points above 390° F. However, it has also been found that when an attempt is made to convert relatively large amounts of alkoxy trichlorosilicates into high-boiling oxychlorides of silicon at rapid rates some of the oxychlorides were hydrolyzed interiorly of the converter tube with the result that the tube was plugged solid with silica within a very short time. Additionally this hydrolysis which rendered any type of thermal converter system inoperative in a short time by reason of the plugging at the outlet of the converter also resulted in the waste of valuable oxychloride by converting it into silica which is useless so far as the final desired product is concerned.

I have discovered that by carrying out the thermal conversion of alkoxy trichlorosilanes in the presence of boron oxide it is possible to prevent the formation of the silica deposit which had caused the plugging of the converter tube, thus rendering practical the conversion of large amounts of alkoxy trichlorosilanes into high-boiling oxychlorides at rapid rates. As a matter of fact not only does the boron oxide prevent converter plugging but also results in the production of a better yield of high-boiling oxychlorides of silicon. It would appear that boron oxide acts as a catalyst inasmuch as it was unaffected by the conversion.

In the practice of the present process boron oxide in lump or powder form and in suitable open containers, such as porcelain boats, is placed within the reaction zone of a converter tube, as for instance a Vycor. The converter tube is then heated to reaction temperature and one or more alkoxy trichlorosilanes are passed through the tube. Due to the presence of the boron oxide comparatively large amount of the alkoxy trichlorosilanes can be passed through the tube without the formation of any appreciable silica deposit and hence without plugging or clogging the converter tube.

The process is not limited to any specific manner of presenting or having present the boron oxide. Any manner in which the vapors at reaction temperature will contact the boron oxide will work satisfactorily and almost equally as well. The amount of boron oxide utilized is not critical as the permissible variations in the amount of boron oxide used can be wide. As a matter of fact the reaction tube can be almost filled with boron oxide without rendering the process unsatisfactory.

Example 1

Six porcelain boats measuring ¾" x ¾" x 4" and about ½ filled with boron oxide are equally spaced within the reaction zone of a typical converter such as a Vycor tube 2" I. D. x 48" in length. The converter is heated to 1300° F. and monoethoxy trichlorosilane ($C_2H_5OCl_3Si$) is passed through the tube for a period of 8 hours at the rate of 6 pounds per hour. Operation over this period produces an 85% conversion to high-boiling oxychlorides of silicon with boiling points above 390° F. without any appreciable plugging whatsoever of the converter tube.

Under the same conditions of heating and input without the use of boron oxide the treatment would produce less than 50% conversion to high-boiling oxychlorides of silicon with boiling points above 390° F. and additionally the converter tube would be rendered substantially inoperative in about one hour due to plugging.

By heating monoethoxy trichlorosilane in a reaction tube such as I have described and with $B_2O_3$ present as a catalyst the following reactions take place all at one time giving a mixture of oxychlorides of silicon:

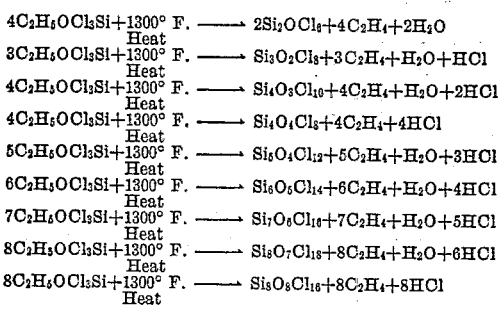

*Example 2*

Utilizing a similar set up of converter tube and porcelain boats containing boron oxide but heating the tube to 950° F. monoisopropoxy trichlorosilane (($CH_3)_2CHOCl_3Si$)) is converted into high-boiling oxychlorides of silicon having boiling points above 390° F. with equally good results. Here again it has been found that the elimination of boron oxide results in the plugging of the converter within one hour or less, thus rendering the converter tube substantially useless and inoperative.

By heating monoisopropoxy trichlorosilane in a reaction tube such as I have described and with $B_2O_3$ present as a catalyst the following reactions take place all at one time, giving a mixture of oxychlorides of silicon:

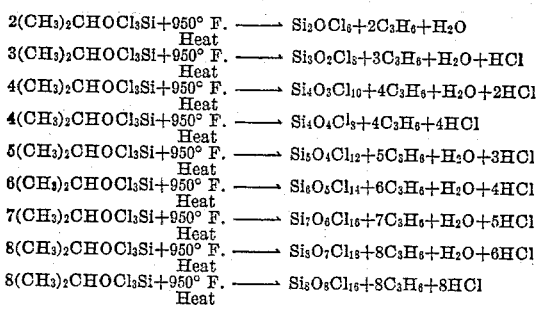

More specifically respecting the boron oxide it has been found, as stated, that the amount used is not critical. Actually a small amount has been found to work substantially as well as a large amount. The boron oxide, so far as can be determined, does not enter the reaction in any way since it is unchanged either in weight or color by its use during the conversion.

The boron oxide can be retained in the converter tube in numerous different manners as previously suggested. It could be coated on lengths or pieces of glass or porcelain and held out of contact with walls of the converter in some suitable way such as by pieces of uncoated material. It could be ground into fine powder and fired on the walls of the converter tube as a thin interior coating therefor. It could be coated on the outside of a tube which could be held in coaxial position interiorly of the converter tube.

While the use of pure boron oxide as a catalyst is preferred it has been found that boron oxide even when mixed with other materials exerts a catalytic effect.

The boron oxide in a borosilicate glass has been found to be effective in the process although not to the extent of boron oxide. High borosilicate glasses have been used successfully, particularly in the thermal conversion of monoisopropoxy trichlorosilicates.

I claim:

1. In a process of preparing silicon oxychlorides by thermal decomposition of alkoxy trichlorosilane, wherein the alkoxy trichlorosilane in vapor form is passed through the reaction zone of a converter tube with recovery of silicon oxychlorides of high boiling point, the improvement which comprises carrying out the reaction in the presence of boron oxide whereby clogging of the converter tube is prevented and a large percentage of silicon oxychlorides of boiling points above 390° F. are recovered over a period of at least several hours.

2. In a process of preparing silicon oxychlorides of high boiling point by thermal decomposition of alkoxy trichlorosilane in a converter tube, the improvement which comprises carrying out the reaction in the presence of boron oxide whereby clogging of the converter tube is avoided.

3. A process as set forth in claim 2 wherein the alkoxy trichlorosilane treated is monoethoxy trichlorosilane.

4. A process as set forth in claim 2 wherein the alkoxy trichlorosilane reacted is monoisopropoxy trichlorosilane.

VAUGHAN MORRILL, JR.

REFERENCES CITED

The following references are of record in the file of this patent:

UNITED STATES PATENTS

| Number | Name | Date |
|---|---|---|
| 2,339,248 | Danforth | Jan. 18, 1944 |
| 2,379,081 | Huppke et al. | June 26, 1945 |
| 2,559,167 | Myers | July 3, 1951 |

OTHER REFERENCES

Peppard et al.: "Preparations and Synthetic Applications of Alkyl Chlorosilicates," Journal of American Chemical Society, vol. 68, Jan. 1946, pages 70–72.